United States Patent [19]

Houska

[11] Patent Number: 6,131,668

[45] Date of Patent: Oct. 17, 2000

[54] SOD LAYING APPARATUS AND METHOD

[75] Inventor: Ronald L. Houska, Foristell, Mo.

[73] Assignee: Clark Equipment Company, Woodcliff Lake, N.J.

[21] Appl. No.: 08/998,794

[22] Filed: Dec. 29, 1997

[51] Int. Cl.[7] .................................................. A01B 63/00
[52] U.S. Cl. .............................. 172/253; 414/911; 172/19
[58] Field of Search .................................... 172/1, 19, 20, 172/21, 26, 33, 40, 101, 253, 776, 681, 245, 246, 247; 414/789.7, 791.6, 911; 111/100, 200

[56] References Cited

U.S. PATENT DOCUMENTS

| | | | |
|---|---|---|---|
| 3,285,625 | 11/1966 | Krueger | 280/479 |
| 3,509,944 | 5/1970 | Brouwer et al. | 172/19 |
| 3,812,918 | 5/1974 | Beck | 172/19 |
| 3,968,940 | 7/1976 | Godbersen . | |
| 3,982,711 | 9/1976 | Bradley et al. . | |
| 3,997,069 | 12/1976 | McCanse et al. . | |
| 4,044,963 | 8/1977 | Hostetler . | |
| 4,148,399 | 4/1979 | Carter et al. . | |
| 4,280,777 | 7/1981 | Gray . | |
| 4,354,556 | 10/1982 | Evans . | |
| 4,538,948 | 9/1985 | Melton . | |
| 4,754,815 | 7/1988 | Brouwer et al. . | |
| 4,777,890 | 10/1988 | Raymond . | |
| 4,796,826 | 1/1989 | Pierce | 242/86.5 R |
| 4,878,542 | 11/1989 | Brouwer et al. . | |
| 4,890,801 | 1/1990 | Brouwer et al. . | |
| 5,026,238 | 6/1991 | Walt | 414/24.5 |
| 5,082,413 | 1/1992 | Grosz et al. | 414/24.5 |
| 5,129,462 | 7/1992 | Mail . | |
| 5,215,278 | 6/1993 | Hess . | |
| 5,307,880 | 5/1994 | Woerner . | |
| 5,437,528 | 8/1995 | Decker . | |
| 5,454,433 | 10/1995 | Worrel et al. | 172/20 |
| 5,626,195 | 5/1997 | Dover | 172/19 |
| 5,697,452 | 12/1997 | Link | 172/19 |
| 5,775,436 | 7/1998 | Noyes, II et al. | 172/19 X |
| 5,857,527 | 1/1999 | Van Vuuren | 172/19 |

FOREIGN PATENT DOCUMENTS

| | | |
|---|---|---|
| 532 915 | 10/1983 | Australia . |
| 0 178 081 | 4/1986 | European Pat. Off. . |
| 0 726 023 | 8/1996 | European Pat. Off. . |
| 2 272 623 | 5/1994 | United Kingdom . |

Primary Examiner—Victor Batson
Attorney, Agent, or Firm—Westman, Champlin & Kelly, P.A.

[57] ABSTRACT

Sod laying apparatus for use with a self propelled vehicle. The vehicle has a front end mounting mechanism having an attachment engagement member for releasably engaging an attachment. The attachment engagement member is moveable between an attachment engagement position in which the engagement member is positioned in a manner to support the attachment in a position suitable for operating the attachment, and an attachment disengagement position in which the engagement member is positioned to facilitate disengagement of the engagement member from the attachment. The sod laying apparatus comprises a sod unrolling unit having a support mechanism, and a sod engagement mechanism connected to the support mechanism. The sod engagement mechanism is configured to engage a roll of sod in a manner to facilitate rotation of the roll of sod relative to the support mechanism. The support mechanism is adapted to be releasably engaged and supported by the attachment engagement member when the attachment engagement member is in its engagement position and adapted to be disengaged from the attachment engagement member when the attachment engagement member is in its disengagement position.

20 Claims, 6 Drawing Sheets

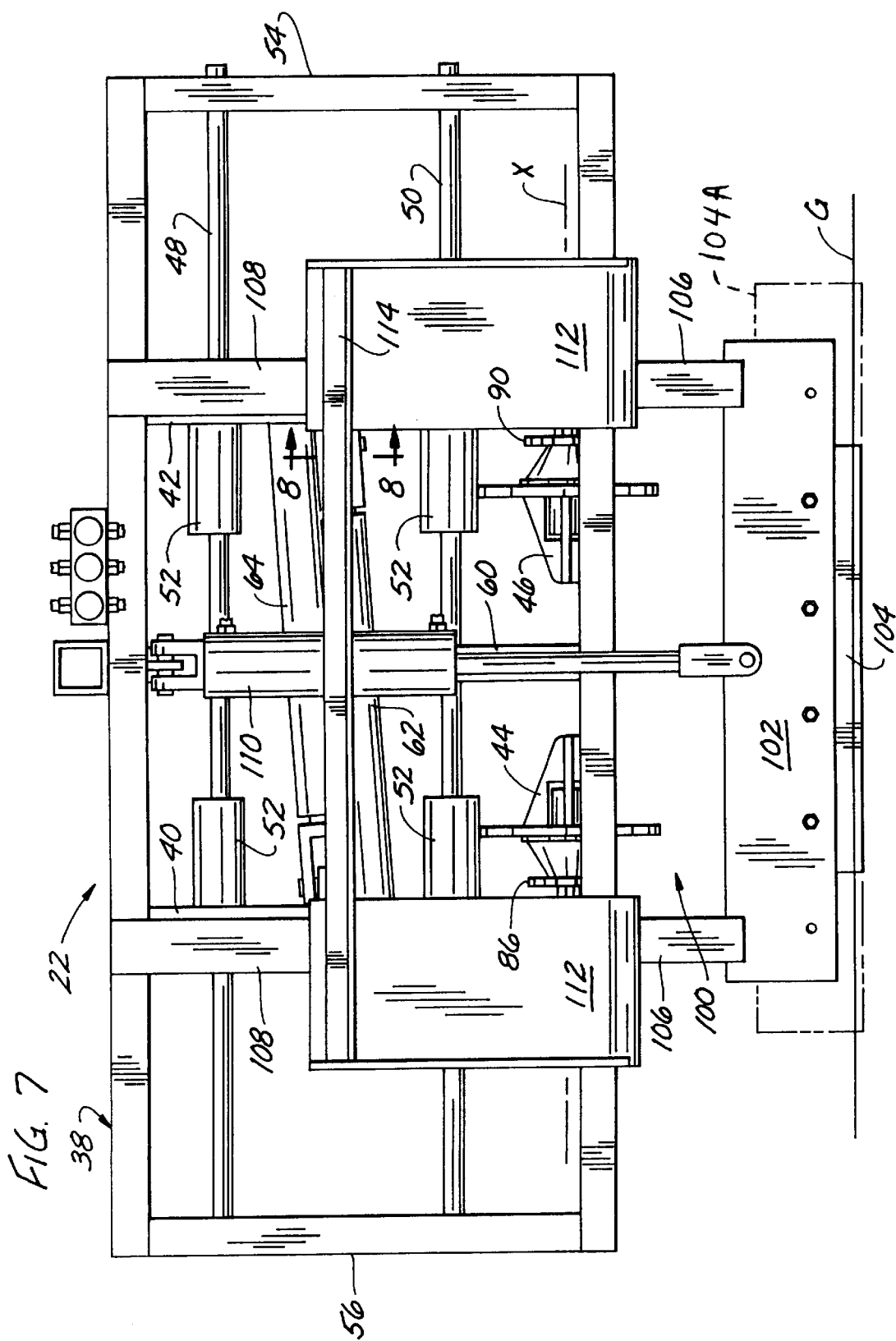

SOD LAYING APPARATUS AND METHOD

BACKGROUND OF THE INVENTION

This invention relates to sod laying apparatus and methods of laying sod.

Conventional sod laying machines are used for unrolling large rolls of sod to produce a lawn. Such machines generally have a sod roll holding portion engageable with the roll of sod, and a power train for propelling the holding portion. These sod laying machines are dedicated machines useful only for laying or harvesting sod, and are expensive because they must include a power train.

Most sod laying machines are capable of elevating the sod roll above the ground so that the sod roll does not drag on the ground as it is transported to a location where the operator desires to lay the sod. However, with at least some of these machines, the sod rolls tend to unravel when in their elevated positions, thereby making it difficult to control where the sod is laid.

Another problem associated with conventional sod laying machines is that the sod roll is held by the machine in only one lateral position relative to the machine. Because of this, it is often difficult to use the machine to lay sod along walls or fences.

SUMMARY OF THE INVENTION

Among the several objects of the present invention may be noted the provision of an improved apparatus and method for laying sod; the provision of such apparatus and method which overcomes the above-noted disadvantages of conventional sod laying machines; the provision of such apparatus adapted to be releasably attached to a multi-purpose vehicle without the need for an operator riding in such vehicle to dismount the vehicle; the provision of such apparatus which prevents unraveling of the roll of sod when the roll of sod is elevated above the ground, the provision of such apparatus which permits rotation of the roll of sod only when the rolled portion of the roll of sod engages the ground; the provision of such apparatus which is capable of holding the roll of sod in a plurality of different lateral positions to vary the unrolling position of the sod relative to the apparatus; the provision of such apparatus capable of cutting an unrolled portion of the sod roll; the provision of such apparatus which is of relatively simple and inexpensive construction.

In general, sod laying apparatus of the present invention is for use with a multi-purpose self propelled vehicle. The vehicle has a front end mounting mechanism and a power mechanism. The front end mounting mechanism has an attachment engagement member adapted to releasably engage an attachment. The power mechanism is adapted to move the attachment engagement member between an attachment engagement position in which the engagement member is positioned in a manner to support the attachment in a position suitable for operating the attachment, and an attachment disengagement position in which the engagement member is positioned to facilitate disengagement of the engagement member from the attachment. The sod laying apparatus comprises a sod unrolling unit including a support mechanism, and a sod engagement mechanism connected to the support mechanism. The sod engagement mechanism is adapted to engage a roll of sod in a manner to facilitate rotation of the roll of sod relative to the support mechanism. The support mechanism is adapted to be releasably engaged and supported by the attachment engagement member when the attachment engagement member is in its engagement position and adapted to be disengaged from the attachment engagement member when the attachment engagement member is in its disengagement position.

Another aspect of the present invention is a sod laying apparatus for unrolling a roll of sod onto a surface. The sod laying apparatus comprises a frame, at least one sod engagement member, and a locking mechanism. The sod engagement member is operatively connected to the frame for rotation of the sod engagement member relative to the frame. The sod engagement member is engageable with the roll of sod in a manner so that the roll of sod rotates with the sod engagement member and in a manner to support the roll of sod spaced above the surface when the sod engagement member is sufficiently spaced above the surface. The locking mechanism is moveable between a locking position and an unlocking position. The locking mechanism is adapted to prevent rotation of the sod engagement member relative to the frame when in its locking position, and is adapted to permit rotation of the sod engagement member relative to the frame when in its unlocking position. The locking mechanism is adapted to move from its unlocking position toward its locking position upon application of a downward force on the sod engagement member. The locking mechanism is adapted to move from its locking position toward its unlocking position upon application of an upward force on the sod engagement member.

Another aspect of the present invention is a sod laying apparatus for unrolling a roll of sod along a longitudinal pathway on a surface in which the sod laying apparatus comprises a frame, at least one sod engagement member, and a sod cutting blade. The sod engagement member is operatively connected to the frame for rotation of the sod engagement member relative to the frame. The sod engagement member is engageable with the roll of sod in a manner to support the roll of sod. The frame and sod engagement member are adapted to facilitate unrolling of the roll of sod along the longitudinal pathway as the frame passes over the pathway. The sod cutting blade is adapted to sever an unrolled portion of the sod roll as the sod engagement member supports a rolled portion of the sod roll. The sod cutting blade being is operatively connected to the frame for movement of the sod cutting blade relative to the frame between a raised position and a lowered cutting position. The sod cutting blade has a length at least substantially the width of the roll of sod and is positioned to extend across the entire width of the roll of sod as the roll of sod is supported by the sod engagement member.

Another aspect of the present invention is a sod laying apparatus a frame, a pair of arms, a pair of sod engagement members, and an actuator mechanism. The arms are moveable relative to the frame along a path transverse to the longitudinal pathway. The sod engagement members are operatively connected to the arms and adapted for engaging opposite ends of the roll of sod in a manner for supporting and guiding the roll of sod. The actuator mechanism is operatively connected to the arms in a manner for moving the arms in the path. The actuator mechanism and the arms are adapted to laterally shift the pair of sod engagement members to facilitate lateral positioning of the roll of sod relative to the frame to thereby laterally adjust the longitudinal pathway relative to the frame.

A further aspect of the present invention is a method of unrolling a roll of sod with a sod laying apparatus. The sod laying apparatus comprises a self propelled vehicle and a sod unrolling unit, the self propelled vehicle has a front end mounting mechanism and a power mechanism. The front end mounting mechanism has an attachment engagement member. The sod unrolling unit comprising a support mechanism and a sod engagement mechanism connected to the support mechanism. The method comprises: propelling the vehicle from an initial position in which the attachment engagement member of the vehicle is spaced from the support mechanism of the sod unrolling unit to an aligned position in which the attachment engagement member is aligned with and proximate to the support mechanism; raising the attachment engagement member in a manner to cause it to interlock with the support mechanism and elevate the sod unrolling unit; engaging the roll of sod with the sod engagement mechanism in a manner to facilitate rotation of the roll of sod relative to the support mechanism; and propelling the vehicle, sod unrolling unit, and roll of sod in a manner to cause unrolling of the roll of sod along a longitudinal pathway.

Other objects and features will be in part apparent and in part pointed out hereinafter.

BRIEF DESCRIPTION OF THE DRAWINGS

FIG. 7 is a rear elevational view of the sod unrolling unit of FIGS. 1-3;

Corresponding reference characters indicate corresponding parts throughout the several views of the drawings.

DESCRIPTION OF THE PREFERRED EMBODIMENTS

Figure 1:
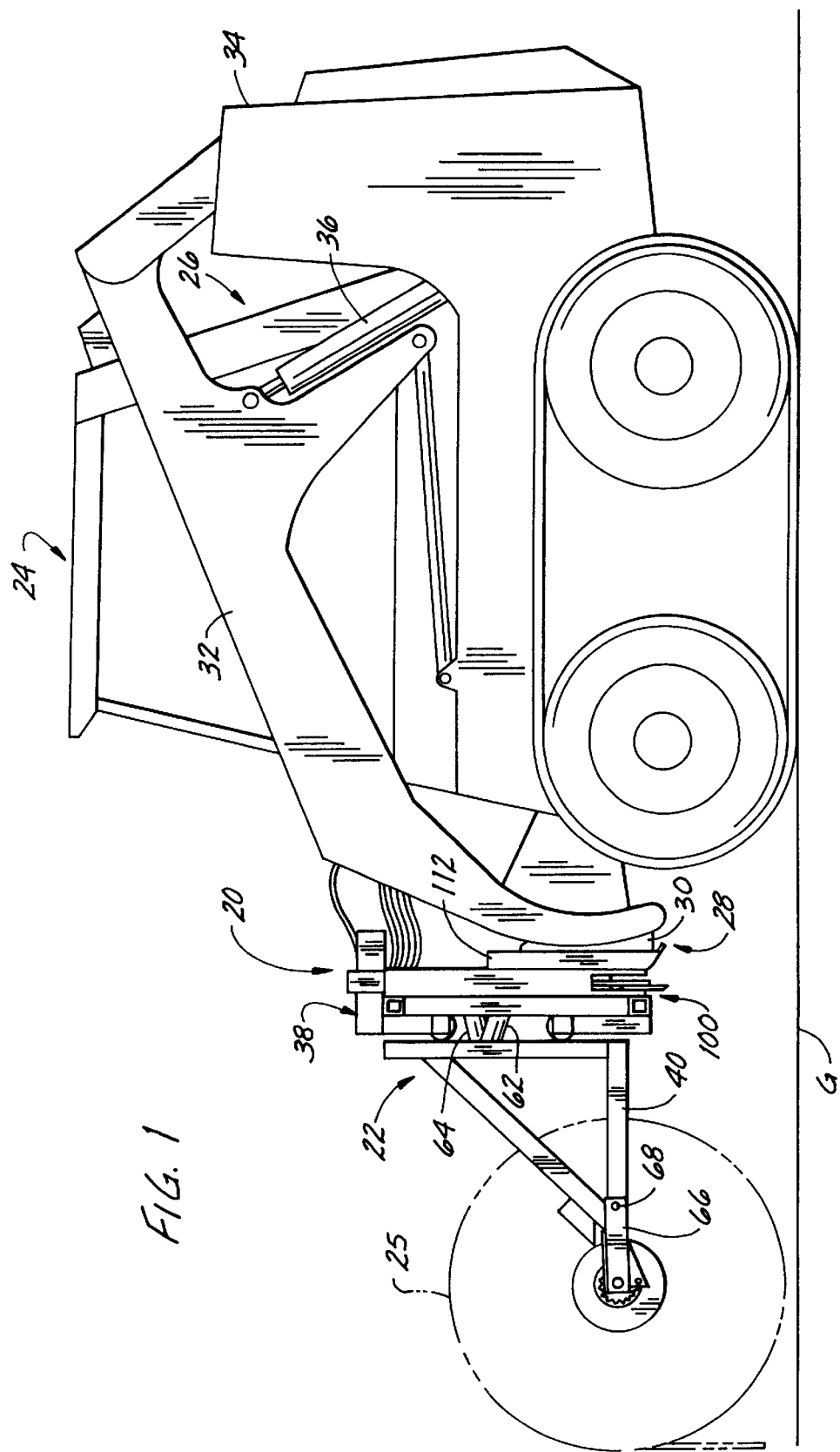
FIG. 1 is a side elevational view of a sod laying apparatus of the present invention comprising a sod unrolling unit attached to a multi-purpose, self-propelled vehicle.
Figure 2:
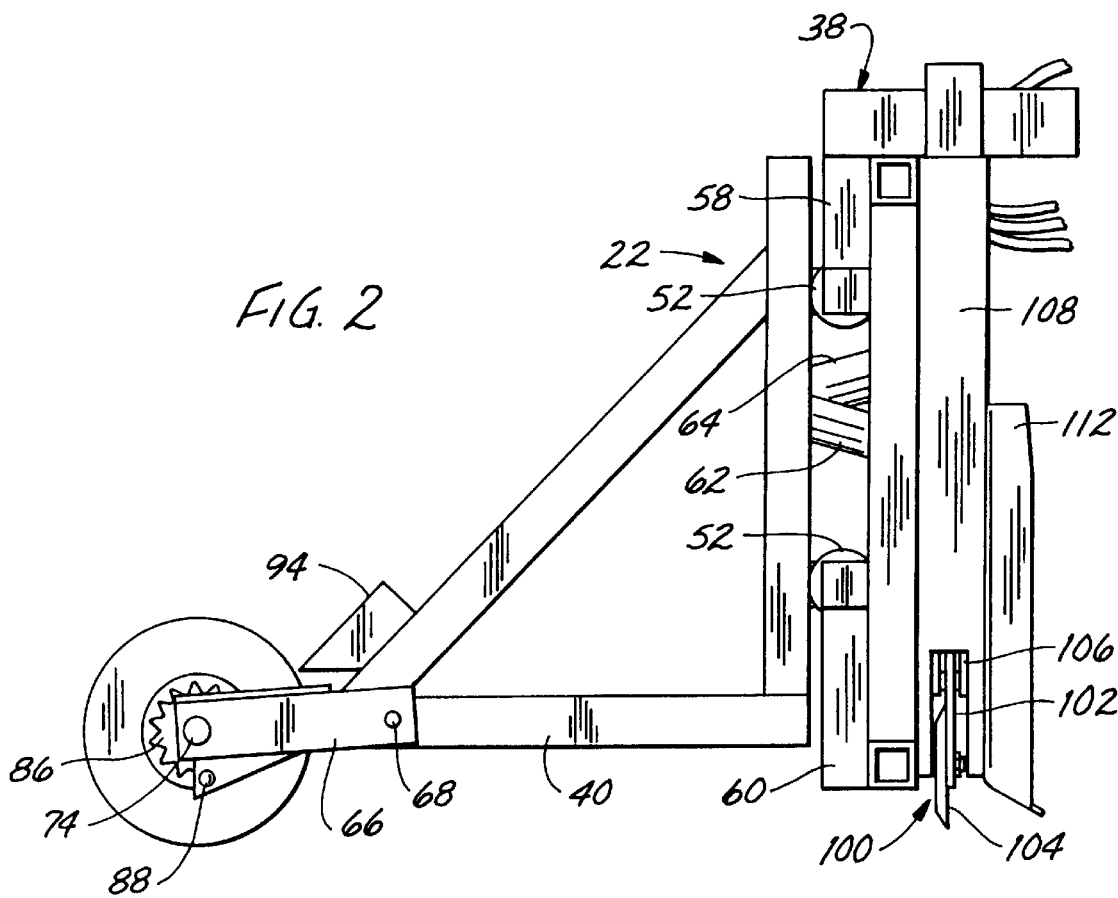
FIG. 2 is an enlarged side elevational view of the sod laying apparatus of FIG. 1.

Referring now to the drawings, and first more particularly to FIGS. 1–4, a sod laying apparatus of the present invention is indicated in its entirety by the reference numeral 20. The sod laying apparatus 20 shown in FIG. 1 comprises a sod unrolling unit, generally indicated at 22, releasably attached to a multi-purpose, self-propelled vehicle, generally indicated at 24. The vehicle 24 may be any suitable vehicle, such as a skid steer loader or a tractor with a three point hitch. The primary purpose of the sod laying apparatus 20 is to unroll a sod roll 25 (shown in phantom in FIG. 1) to produce a lawn. It is to be understood that the sod roll 25 is a spiral roll of grass which has been rolled to form a cylinder with an outwardly facing dirt/root side and an inwardly facing grass side. As described in greater detail below, the sod laying apparatus 20 is configured to lower the sod roll 25 on a surface (such as ground G) and propel the sod roll forward (i.e., from right to left as viewed in FIG. 1) so that the engagement of the ground with the sod roll causes the roll to rotate in a counter-clockwise direction to unroll the sod roll with the unrolled portion being laid along a longitudinal pathway essentially followed by the vehicle.

The vehicle 24 has a power mechanism 26 and a front end mounting mechanism 28. The front end mounting mechanism 28 has a pair of attachment engagement members (or tines) 30 (only one of which is shown in FIG. 1) connected to a forward end of a boom 32 which is pivotally connected to the vehicle chassis 34. The tines 30 are adapted to releasably engage an attachment, i.e., a mechanism used in conjunction with the vehicle to perform a particular function. The power mechanism 26 comprises a pair of large linear actuators 36 for pivoting the boom 32 relative to the vehicle chassis 34 to move the tines 30 between a raised position (i.e., an attachment engagement position in which the tines are positioned in a manner to support the attachment in a position suitable for operating the attachment) and a lowered position (i.e., an attachment disengagement position in which the tines are positioned to facilitate disengagement of the tines from the attachment).

Figure 3:
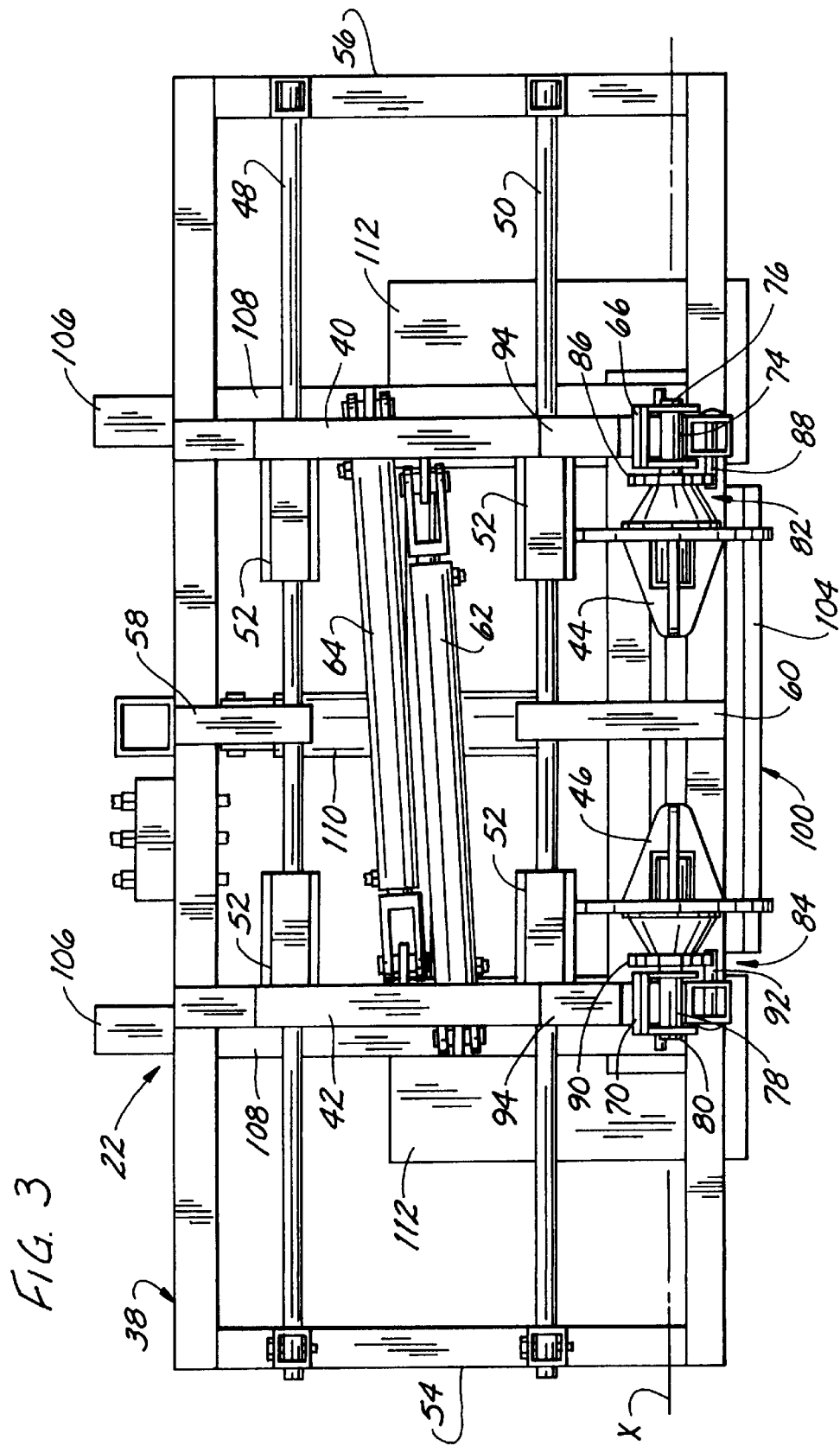
FIG. 3 is a front elevational view of the sod unrolling unit of FIGS. 1 and 2, the sod unrolling unit having a frame, a pair of arms extending forward of the frame, and a pair of sod engaging members operatively connected to forward ends of the arms.
Figure 4:
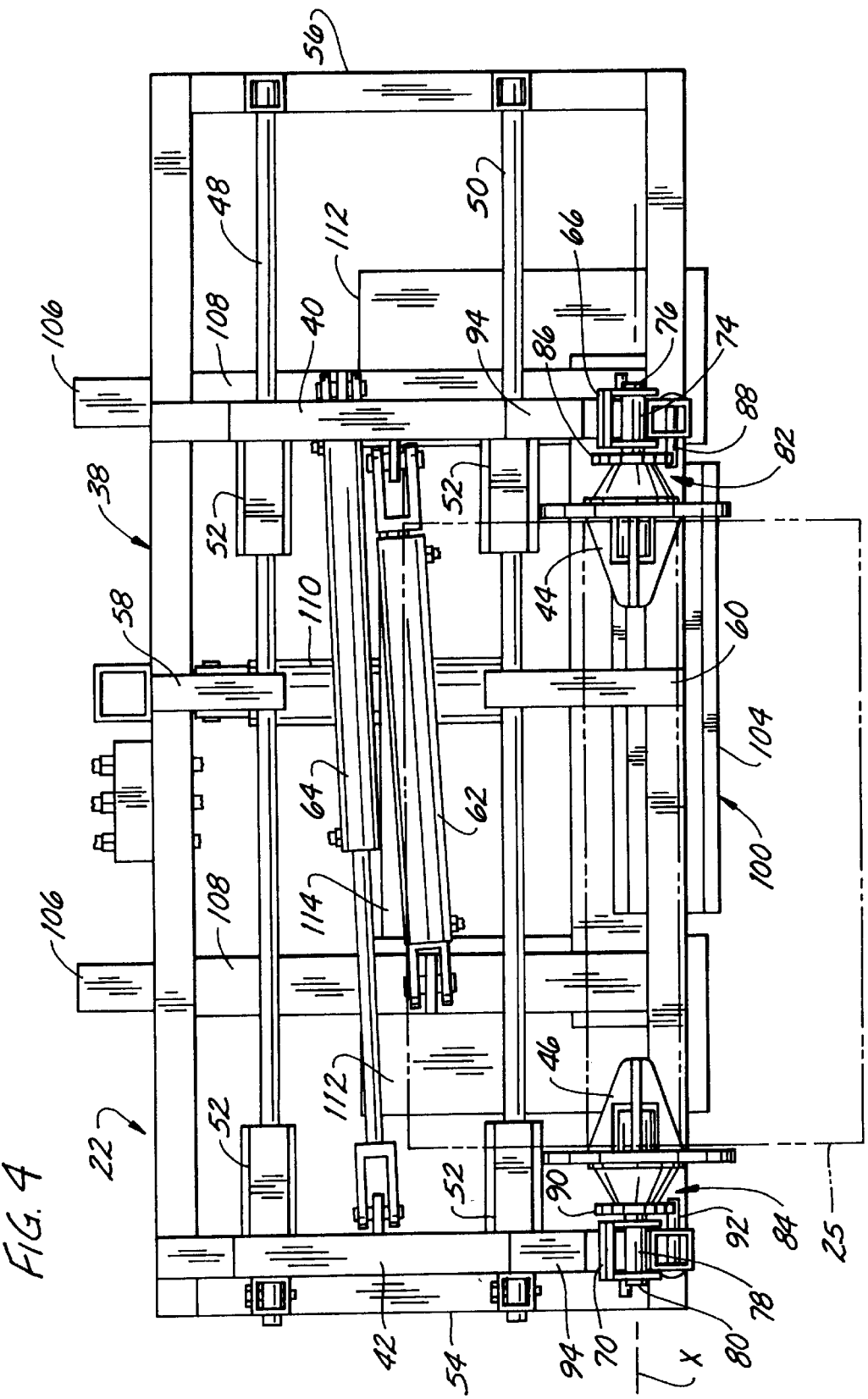
FIG. 4 is a front elevational view similar to FIG. 3, but showing one of the arms shifted laterally, a sod roll being shown in phantom.

The sod unrolling unit 22 comprises a frame (or support mechanism), generally indicated at 38, first (left) and second (right) forwardly extending arms 40, 42, and first (left) and second (right) inwardly extending sod engagement members 44, 46 configured for grabbing opposite sides of the sod roll 25. The first and second arms 40, 42 are connected to the frame 38 via upper and lower guide rods 48, 50 fixed at their ends to the frame. The guide rods 48, 50 are generally horizontal and extend transversely (i.e., across the longitudinal pathway). The arms 40, 42 are slidably supported on the rods 48, 50 via suitable bearing blocks 52 for movement of the arms along the rods between laterally inward and outward positions. In FIG. 3, the arms 40, 42 are shown in their inward positions (i.e., positions relatively close to the center of the frame). The right arm 42 is shown in FIG. 4 in its outward position adjacent the right end 54 of the frame 38. Although not shown, it is to be understood that the left arm 40 is adjacent the left end 56 of the frame 28 when in its outward position. Preferably, the frame 38 includes upper and lower rod support braces 58, 60 for supporting central regions of the upper and lower guide rods 48, 50. The left arm 40 is moveable between its inward and outward positions via a first linear actuator 62 and the right arm 42 is moveable between its inward and outward positions via a second linear actuator 64. Preferably, the linear actuators 62, 64 are fluid pressure actuator cylinders. Although the arms are preferably moved between their inward and outward positions with linear actuators, it is to be understood that other mechanisms, such as gear type mechanism, could be employed without departing from the scope of this invention.

A rearward end of a left pivot member (bar) 66 is pivotally connected at 68 (FIG. 2) to a forward portion of the left arm 40. A rearward end of a right pivot member (bar) 70 is pivotally connected at 72 (FIGS. 5 and 6) to a forward portion of the right arm 42. The left sod engagement member 44 has a shaft 74 rotatably connected to a forward end of the left pivot bar 66 via a left bearing 76 for rotation of the left sod engagement member relative to the left arm 40 about a horizontal, transversely extending axis X (FIGS. 3 and 4). The right sod engagement member 46 has a shaft 78 rotatably connected to a forward end of the right pivot bar 70 via a right bearing 80 for rotation of the right sod engagement member relative to the right arm 42 about the axis X.

The sod unrolling unit 22 further includes a left locking mechanism, generally indicated at 82, and a right locking mechanism, generally indicated at 84. The left locking mechanism 82 includes a left locking wheel 86 and a left pin 88. The left locking wheel 86 is fixed to and rotatable with the shaft 74 of the left sod engagement member 44, and the left pin 88 is fixed to and extends inwardly from the forward end of the left arm 40. The right locking mechanism 84 includes a right locking wheel 90 and a right pin 92. The right locking wheel 90 is fixed to and rotatable with the shaft 78 of the right sod engagement member 46, and the right pin 92 is fixed to and extends inwardly from the forward end of the right arm 42. Preferably, each locking wheel 86, 90 is shaped substantially like a gear and includes a plurality of radially extending teeth.

Figure 5:
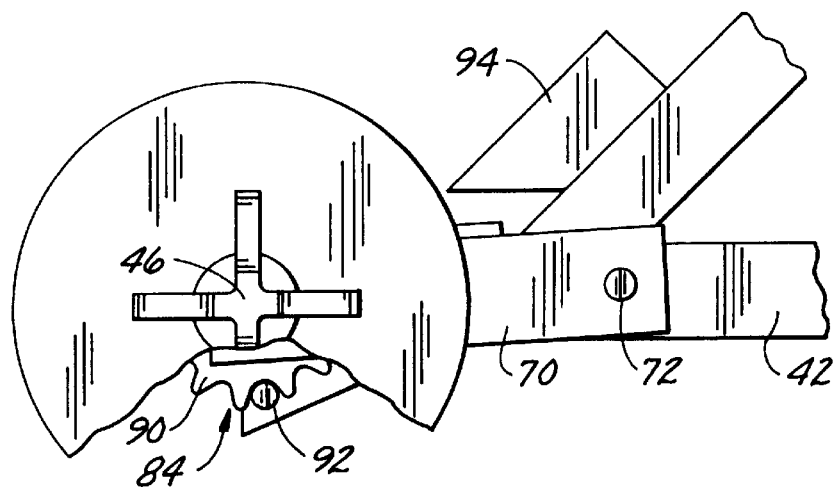
FIG. 5 is an enlarged, fragmented elevational view of one of the sod engaging members and one of the arms of the sod unrolling unit of FIGS. 1-3 with portions of the sod engaging member broken away to show a locking mechanism in a locked position, the locking mechanism being configured to prevent rotation of the sod engaging member relative to the arm.
Figure 6:
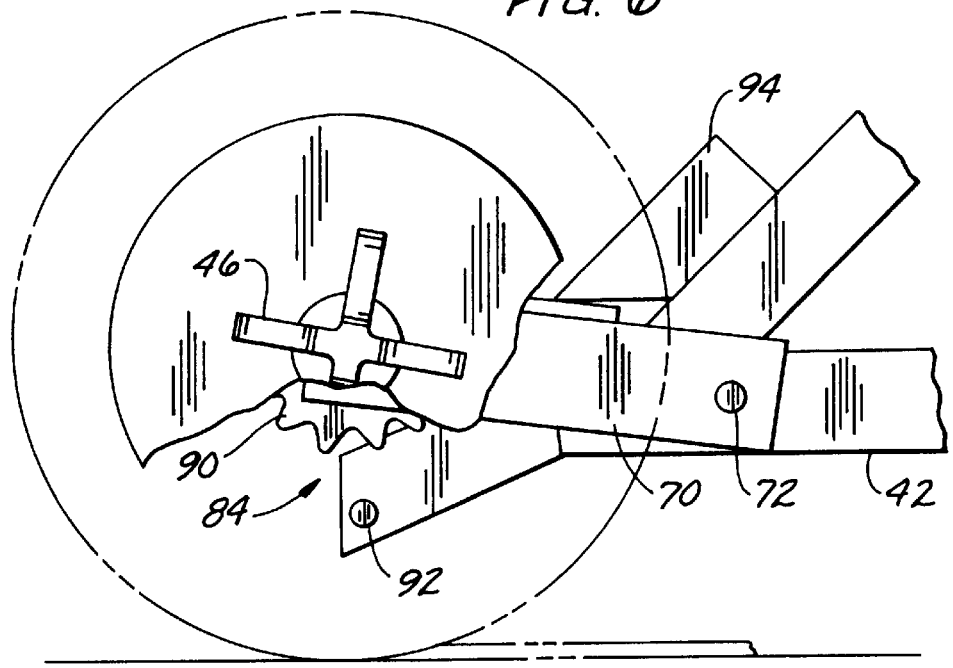
FIG. 6 is an enlarged, fragmented elevational view similar to FIG. 5 but showing the locking mechanism in an unlocked position and showing a sod roll in phantom.

As shown in FIGS. 5 and 6, the right locking wheel 90 is moveable relative to the right arm 42 between a lowered (locked) position (FIG. 5) and a raised (unlocked) position (FIG. 6). When the right locking wheel 90 is in its locked position, the right pin 92 engages the teeth of the right locking wheel 90 to lock against rotation of the wheel and right sod engagement member 46 relative to the pin. When the right locking wheel 90 is in its unlocked position, it is spaced above the right pin 92 and therefore the right pin 92 does not hinder rotation of the wheel and right sod engagement member 46 about the axis X. Although not specifically described, it is to be understood that the left locking mechanism 82 operates the same way as the right locking mechanism 84. Because of this configuration, when the sod laying apparatus 20 supports the sod roll 25 so that the roll is spaced above the ground (as shown in FIG. 1), then the weight of the sod roll and the weight of the sod engagement members 44, 46 cause the pivot bars 66, 70 to pivot downward to the lowered locking positions of the locking mechanisms 82, 84. When the boom 32 of the vehicle 24 is lowered to press the sod roll 25 against the ground G, then the sod roll exerts an upwardly directed force against the sod engagement members 44, 46 to cause the pivot bars 66, 70 to pivot upward to the raised unlocking positions of the locking mechanisms 82, 84. Preferably, forwardly extending limit blocks 94 are fixed to the arms 40, 42 and engageable with the pivot bars 66, 70 when the locking wheels are in their raised position (FIG. 6) to limit upward movement of the sod engagement members 44, 46 relative to the arms.

Referring now to FIGS. 3, 4, and 7, the sod unrolling unit 22 further includes a sod cutting mechanism, generally indicated at 100. The sod cutting mechanism 100 includes a blade support plate 102 and a cutting blade 104 releasably secured to the blade support plate. The blade support plate 102 is secured to lower ends of two vertical bars 106 which extend upward through guide tubes 108 fixed to the frame 38. The bars 106 and tubes 108 are sized and configured to permit the bars to slide up and down through the tubes to keep the blade support plate 102 in a horizontal, transverse orientation relative to the frame 38. The cutting blade 104 and blade support plate 102 are vertically moveable via suitable drive mechanism, such as a linear actuator 110. Preferably, the linear actuator 110 comprises a vertically oriented fluid pressure cylinder. The linear actuator 110 moves the cutting blade 104 between a raised position (shown in FIGS. 3 and 4) in which the blade is spaced above the ground G and spaced above any unrolled portion of the sod roll, and a lowered position (shown in FIG. 7) in which the bottom edge of the cutting blade extends at least partially into the ground G to sever an unrolled portion of sod laying on the ground and positioned below the blade. Preferably, the cutting blade 104 has a length at least substantially the width of the roll of sod and is positioned to extend across the entire width of the roll of sod as the roll of sod is supported by the sod engagement members 44, 46 so that the sod can be completely severed by a single movement of the cutting blade from its raised position to its lowered position. The cutting blade 104 (shown in solid in FIG. 7) is relatively short and is therefore intended to be used with relatively narrow sod rolls. A longer replacement cutting blade 104A (shown in phantom in FIG. 7) may be employed when the sod laying apparatus 20 is used to lay a wider roll of sod. As the sod is being unrolled by the sod laying apparatus, the frame 38, cutting blade 104 and vehicle 24 pass over the unrolled portion of sod. When an operator desires to sever the unrolled portion of sod, he or she stops the vehicle 24 at the desired location so that the cutting blade 104 is positioned over the desired area. The user then actuates the linear actuator 110 to move the cutting blade to its lowered position to completely sever the portion of sod.

Figure 9:
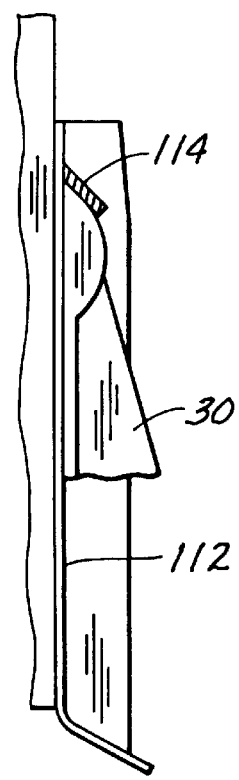
FIG. 9 is an enlarged, fragmented, cross-sectional view similar to FIG. 8 but showing the attachment engagement member inserted into the socket.
Figure 8:
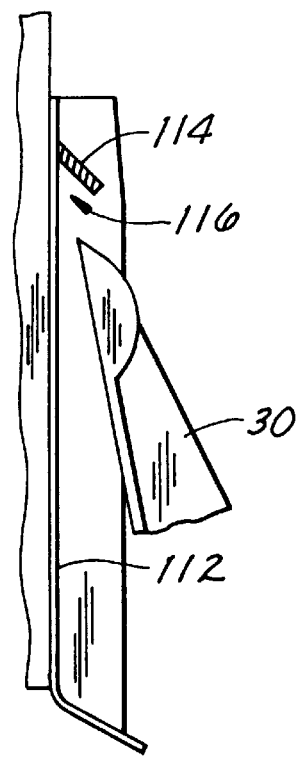
FIG. 8 is an enlarged, fragmented, cross-sectional view taken along the plane of line 8—8 of FIG. 7, but showing an attachment engagement member of the vehicle of FIG. 1 spaced from a supporting socket of the frame of the sod unrolling unit.

Referring now to FIGS. 7–9, the frame 38 further includes two spaced-apart impact plates 112, and a slanted, transversely extending slat 114. The impact plates 112 are welded or otherwise fixed to the guide tubes 108 in a vertical orientation. The slat 114 is secured to and traverses rear faces of the impact plates 112. Preferably, the slat 114 is sloped relative to the impact plates 112 so that the underside of the slat and the rear faces of the impact plates form acute angles (as shown in FIGS. 8 and 9). The slat 114 and the impact plates 112 define tine-receiving sockets 116 (FIG. 8) for receiving the tines 30 of the vehicle 24.

In operation, to attach the sod unrolling unit 22 to the vehicle 24, an operator drives or otherwise propels the vehicle forward toward the sod unrolling unit until the tines 30 at the forward end of the boom 32 engage the rear faces of the impact plates 112. The operator then actuates the large linear actuators 36 to raise the forward end of the boom 32. Raising of the boom 32 causes the tines 30 to extend into the tine-receiving sockets 116 and wedge between the slat 114 and impact plates 112. The wedging action releasably interlocks the tines 30 to the frame 38. Because of the shape of the tine-receiving sockets 116, further upward movement of the boom 32 lifts the sod unrolling unit 22 off the ground. Because of the sockets 116, the tines 30 automatically engage the sockets in a manner to support the sod unrolling unit 22 upon movement of the boom 32 from a lowered position to a raised position. Likewise, because of the location, shape and orientation of the sockets, the tines 30 are automatically disengaged from the sockets upon movement of the boom 32 from its raised position to its lowered position. Preferably, the vehicle includes an attachment fastening mechanism (not shown) for fastening the tines 30 to the slat 116. The operator can generally fasten the tines 30 to the slats 116 via the attachment fastening mechanism without getting off the vehicle 24 After the sod unrolling unit 22 is securely attached to the vehicle 24, the operator connects fluid lines (not shown) from the vehicle to fluid lines (not shown) of the sod unrolling unit 22 to enable the operator to operate the three linear actuators 62, 64, 110 of the sod unrolling unit.

Next, the operator operates the first and second linear actuators 62, 64 to move the arms 40, 42 and associated sod engagement members 44, 46 to their outward positions. The operator then drives the vehicle 24 to a position in which the sod engagement members 44, 46 are in alignment with the axis of rotation of a sod roll. When in this position, the linear actuators 62, 64 are operated to move the arms 40, 42 toward their inward positions until the sod engagement members 44, 46 extend into the sides of the sod roll. The operator then raises the boom 32 to elevate the entire sod roll above the ground G. Preferably, the fluid controls for the linear actuators 62, 64 are configured to enable the operator to selectively operate the linear actuators independently or in tandem. Because of this, the actuators may be operated to shift the sod engagement members 44, 46 laterally (i.e., toward the right or toward the left as viewed in FIGS. 3 and 4). FIG. 4 shows the sod unrolling unit 22 supporting a sod roll 25 in such a laterally offset orientation relative to the frame 38. By laterally shifting or offsetting the sod roll relative to the frame, the position of the longitudinal pathway of the unrolled sod relative to the frame may be adjusted. If it is desirable to have the roll of sod unroll along a side of the vehicle 24 (e.g., when it is desirable to lay sod adjacent a wall or fence), the operator may actuate the actuators 62, 64 to shift the sod roll toward such side.

Because of the locking mechanisms 82, 84, the sod roll cannot rotate and therefore cannot unravel when the sod roll is spaced above the ground. With the sod roll supported above the ground G, the operator drives the vehicle 24 and attached sod unrolling unit 22 to a location in which it he/she desires to lay the sod. The operator then lowers the boom 32 to press the sod roll against the ground and thereby disengage the locking wheels 86, 90 from the pins 88, 92 so that the sod roll can be rolled along the ground G. With the boom so positioned, the operator then propels the vehicle 24 forward to unroll the sod roll along the longitudinal pathway.

As the vehicle 24 moves forward, the cutting blade 104 passes along the longitudinal pathway and over of the unrolled sod. After a desired length of sod is unrolled from the sod roll, the operator then actuates the blade actuator 110 to press the cutting blade 104 through the unrolled portion of sod to thereby sever the sod.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Sod laying apparatus for use with a self propelled vehicle, the vehicle having a front end mounting mechanism and a power mechanism, the front end mounting mechanism having an attachment engagement member adapted to releasably engage an attachment, the power mechanism being adapted to move the attachment engagement member between an attachment engagement position in which the engagement member is positioned in a manner to support the attachment in a position suitable for operating the attachment, and an attachment disengagement position in which the attachment engagement member is positioned to facilitate disengagement of the engagement member from the attachment, the sod laying apparatus comprising:

a sod unrolling unit including a support mechanism having a socket sized and adapted for releasably receiving the attachment engagement member, and a sod engagement mechanism connected to the support mechanism, the sod engagement mechanism being adapted to engage a roll of sod in a manner to facilitate rotation of the roll of sod relative to the support mechanism, the support mechanism being adapted to be releasably engaged and supported by the attachment engagement member when the attachment engagement member is in its attachment engagement position and adapted to be disengaged from the attachment engagement member when the attachment engagement member is in its attachment disengagement position the attachment engagement position comprising a raised position of the attachment engagement member and the attachment disengagement position comprising a lowered position of the attachment engagement member, the socket being sized and oriented so that the attachment engagement member automatically disengages from the socket upon movement of the attachment engagement member from its raised position to its lowered position.

2. Sod laying apparatus as set forth in claim 1 wherein the socket is sized and oriented so that the attachment engagement member automatically engages the socket in a manner to support the sod unrolling unit upon movement of the attachment engagement member from its lowered position to its raised position.

3. Sod laying apparatus for unrolling a roll of sod onto a surface comprising:

a frame;

at least one sod engagement member operatively connected to the frame for rotation of the sod engagement member relative to the frame, the sod engagement member being engageable with the roll of sod in a manner so that the roll of sod rotates with the sod engagement member and in a manner to support the roll of sod spaced above the surface when the sod engagement member is sufficiently spaced above the surface; and a locking mechanism moveable between a locking position and an unlocking position, the locking mechanism being adapted to prevent rotation of the sod engagement member relative to the frame when in its locking position, the locking mechanism being adapted to permit rotation of the sod engagement member relative to the frame when in its unlocking position, the locking mechanism being adapted to move from its unlocking position toward its locking position upon application of a downward force on the sod engagement member, the locking mechanism being adapted to move from its locking position toward its unlocking position upon application of an upward force on the sod engagement member.

4. Sod laying apparatus as set forth in claim 3 wherein the downward force comprises gravitational forces acting upon the sod engagement member caused by the sod engagement member supporting the roll of sod spaced above the surface, the locking mechanism being adapted to be in its locking position when the sod engagement member supports the roll of sod spaced above the surface.

5. Sod laying apparatus as set forth in claim 4 further comprising a pair of arms moveable relative to the frame, and wherein said at least one sod engagement member comprises a pair of sod engagement members operatively connected to the arms and adapted for engaging opposite ends of the roll of sod.

6. Sod laying apparatus as set forth in claim 5 wherein the locking mechanism comprises first and second locking members, the first locking member being connected to and rotatable with one of the sod engagement members, the second locking member being connected to one of the arms, the locking mechanism being configured so that the second locking member is spaced from the first locking member when the locking mechanism is in its unlocking position and interlocks with the first locking member to prevent rotation of the first locking member relative to the second locking member when the locking mechanism is in its locking position.

7. Sod laying apparatus as set forth in claim 6 further comprising a pivot member, the first locking member and said one of the sod engagement members being connected to the pivot member for rotation thereof relative to the pivot member, the pivot member being pivotally connected to said one of the arms between raised and lowered positions, the first locking member being spaced above the second locking member when the pivot member is pivoted to its raised position, the first locking member being in engagement with the second locking member when the pivot member is pivoted to its lowered position.

8. Sod laying apparatus for unrolling a roll of sod along a longitudinal pathway on a surface, the sod laying apparatus comprising:

a frame;

at least one sod engagement member operatively connected to the frame for rotation of the sod engagement member relative to the frame, the sod engagement member being engageable with the roll of sod in a manner to support the roll of sod, the frame and sod engagement member being adapted to facilitate unrolling of the roll of sod along the longitudinal pathway as the frame passes over the pathway; and a sod cutting blade adapted to sever an unrolled portion of the sod roll as the sod engagement member supports a rolled portion of the sod roll, the sod cutting blade being operatively connected to the frame for movement of the sod cutting blade relative to the frame between a raised position and a lowered cutting position, the sod cutting blade having a length at least substantially the width of the roll of sod and being positioned to extend across the entire width of the roll of sod as the roll of sod is supported by the sod engagement member.

9. Sod laying apparatus as set forth in claim 8 wherein the sod cutting blade is operatively connected to the frame in a manner so that the sod cutting blade is spaced above the surface during operation of the sod laying apparatus when the cutting blade is in its raised position, and so that the sod cutting blade is in contact with the surface during operation of the sod laying apparatus when the cutting blade is in its lowered cutting position.

10. Sod laying apparatus as set forth in claim 8 wherein the sod cutting blade is moveable between its raised and lowered positions via a linear actuator.

11. Sod laying apparatus for unrolling a roll of sod along a longitudinal pathway, the sod laying apparatus comprising:

a frame;

a pair of arms moveable relative to the frame along a path transverse to the longitudinal pathway;

a pair of sod engagement members operatively connected to the arms and adapted for engaging opposite ends of the roll of sod in a manner for supporting and guiding the roll of sod; and an actuator mechanism operatively connected to the arms in a manner for moving the arms in the path; the actuator mechanism and the arms being adapted to laterally shift the pair of sod engagement members to facilitate lateral positioning of the roll of sod relative to the frame to thereby laterally adjust the longitudinal pathway relative to the frame.

12. Sod laying apparatus as set forth in claim 11 wherein the path is a linear path, the pair of arms being linearly moveable relative to the frame along the path.

13. Sod laying apparatus as set forth in claim 12 wherein each arm is linearly moveable relative to the frame along the path independently of movement of the other arm.

14. Sod laying apparatus as set forth in claim 13 wherein the actuator mechanism comprises first and second linear actuators, the first linear actuator being operatively connected to one of the arms for moving such arm along the path, the second linear actuator being operatively connected to the other of the arms for moving such other arm along the path.

15. A method of unrolling a roll of sod with a sod laying apparatus comprising a self propelled vehicle and a sod unrolling unit, the self propelled vehicle having a front end mounting mechanism and a power mechanism, the front end mounting mechanism having an attachment engagement member, the sod unrolling unit comprising a support mechanism and a sod engagement mechanism connected to the support mechanism, the method comprising:

propelling the vehicle from an initial position in which the attachment engagement member of the vehicle is spaced from the support mechanism of the sod unrolling unit to an aligned position in which the attachment engagement member is aligned with and proximate to the support mechanism;

raising the attachment engagement member in a manner to cause it to interlock with the support mechanism and elevate the sod unrolling unit;

engaging the roll of sod with the sod engagement mechanism in a manner to facilitate rotation of the roll of sod relative to the support mechanism; and propelling the vehicle, sod unrolling unit, and roll of sod in a manner to cause unrolling of the roll of sod along a longitudinal pathway.

16. Sod laying apparatus for use with a self propelled vehicle, the vehicle having a front end mounting mechanism and a power mechanism, the front end mounting mechanism having an attachment engagement member adapted to releasably engage an attachment, the power mechanism being adapted to move the attachment engagement member between an attachment engagement position in which the engagement member is positioned in a manner to support the attachment in a position suitable for operating the attachment, and an attachment disengagement position in which the attachment engagement member is positioned to facilitate disengagement of the attachment engagement member from the attachment, the sod laying apparatus comprising:

a sod unrolling unit including a support mechanism, and a sod engagement mechanism connected to the support mechanism, the sod engagement mechanism being adapted to engage a roll of sod in a manner to facilitate rotation of the roll of sod relative to the support mechanism, the support mechanism being adapted to be releasably engaged and supported by the attachment engagement member when the attachment engagement member is in its attachment engagement position and adapted to be disengaged from the attachment engagement member when the attachment engagement member is in its attachment disengagement position, the sod engagement mechanism comprising at least one sod engagement member and a locking mechanism, the sod engagement member being operatively connected to the support mechanism for rotation of the sod engagement member relative to the support mechanism, the sod engagement member being engageable with the roll of sod in a manner so that the roll of sod rotates with the sod engagement member and in a manner to support the roll of sod spaced above a surface when the sod engagement member is sufficiently spaced above the surface, the locking mechanism being moveable between a locking position and an unlocking position, the locking mechanism being adapted to prevent rotation of the sod engagement member relative to the support mechanism when in its locking position, the locking mechanism being adapted to permit rotation of the sod engagement member relative to the support mechanism when in its unlocking position, the locking mechanism being adapted to move from its unlocking position toward its locking position upon application of a downward force on the sod engagement member, the locking mechanism being adapted to move from its locking position toward its unlocking position upon application of an upward force on the sod engagement member.

17. Sod laying apparatus for use with a self propelled vehicle, the vehicle having a front end mounting mechanism and a power mechanism, the front end mounting mechanism having an attachment engagement member adapted to releasably engage an attachment, the power mechanism being adapted to move the attachment engagement member between an attachment engagement position in which the attachment engagement member is positioned in a manner to support the attachment in a position suitable for operating the attachment, and an attachment disengagement position in which the attachment engagement member is positioned to facilitate disengagement of the engagement member from the attachment, the sod laying apparatus being configured for unrolling the roll of sod along a longitudinal pathway comprising:

a sod unrolling unit including a support mechanism comprising a frame, and a sod engagement mechanism connected to the support mechanism, the sod engagement mechanism being adapted to engage a roll of sod in a manner to facilitate rotation of the roll of sod relative to the support mechanism, the support mechanism being adapted to be releasably engaged and supported by the attachment engagement member when the attachment engagement member is in its attachment engagement position and adapted to be disengaged from the attachment engagement member when the attachment engagement member is in its attachment disengagement position, said sod laying apparatus further comprising a sod cutting blade, the support mechanism comprising a frame, and the sod engagement mechanism comprising at least one sod engagement member, the sod engagement member being operatively connected to the frame for rotation of the sod engagement member relative to the frame, the sod engagement member being engageable with the roll of sod in a manner to support the roll of sod, the frame and sod engagement member being adapted to facilitate unrolling of the roll of sod along the longitudinal pathway as the frame passes over the pathway, the sod cutting blade being adapted to sever an unrolled portion of the sod roll as the sod engagement member supports a rolled portion of the sod roll, the sod cutting blade being operatively connected to the frame for movement of the sod cutting blade relative to the frame between a raised position and a lowered cutting position, the sod cutting blade having a length at least substantially the width of the roll of sod and being positioned to extend across the entire width of the roll of sod as the roll of sod is supported by the sod engagement member.

18. Sod laying apparatus for use with a self propelled vehicle, the vehicle having a front end mounting mechanism and a power mechanism, the front end mounting mechanism having an attachment engagement member adapted to releasably engage an attachment, the power mechanism being adapted to move the attachment engagement member between an attachment engagement position in which the attachment engagement member is positioned in a manner to support the attachment in a position suitable for operating the attachment, and an attachment disengagement position in which the attachment engagement member is positioned to facilitate disengagement of the engagement member from the attachment, the sod laying apparatus being configured for unrolling the roll of sod along a longitudinal pathway comprising:

a sod unrolling unit including a support mechanism comprising a frame, and a sod engagement mechanism connected to the support mechanism, the sod engagement mechanism being adapted to engage a roll of sod in a manner to facilitate rotation of the roll of sod relative to the support mechanism, the support mechanism being adapted to be releasably engaged and supported by the attachment engagement member when the attachment engagement member is in its attachment engagement position and adapted to be disengaged from the attachment engagement member when the attachment engagement member is in its attachment disengagement position, and the sod engagement mechanism comprising a pair of arms, a pair of sod engagement members, and an actuator mechanism, the arms being moveable relative to the frame along a path transverse to the longitudinal pathway, the sod engagement members being operatively connected to the arms and adapted for engaging opposite ends of the roll of sod in a manner for supporting and guiding the roll of sod, the actuator mechanism being operatively connected to the arms in a manner for moving the arms in the path, the actuator mechanism and the arms being adapted to laterally shift the pair of sod engagement members to facilitate lateral positioning of the roll of sod relative to the frame to thereby laterally adjust the longitudinal pathway relative to the frame.

19. Sod laying apparatus for use with a self propelled vehicle, the vehicle having a mounting mechanism for supporting the sod laying apparatus, the sod laying apparatus comprising:

a sod unrolling unit including a support frame for connection to the mounting mechanism, and a pair of sod engagement arms connected to the support frame, the sod engagement arms being adapted to engage a roll of sod in a manner to facilitate rotation of the roll of sod relative to the support frame, the support frame being adapted to be supported by the mounting mechanism, the sod engagement arms each having a rotatable sod engagement member and at least one of the arms and the associated sod engaging member having a locking mechanism, the sod engagement members being engageable with the roll of sod to rotatably support the roll of sod spaced above a surface when the sod engagement members are sufficiently spaced above the surface, the locking mechanism being moveable between a locking position wherein it prevents rotation of the associated sod engagement member relative to the associated arm and an unlocking position, which permits rotation of the associated sod engagement member, the locking mechanism being adapted to move to its locking position when the roll of sod is supported above the surface and said locking mechanism being adapted to move to its unlocking position upon application of an upward force on the roll of sod supported by the arms.

20. Sod laying apparatus as set forth in claim 19 wherein a downward force on at least one arm and sod engaging member moves the locking mechanism to its unlocking position and comprises gravitational forces acting upon the sod engagement member caused by the sod engagement member supporting the roll of sod spaced above the surface.

* * * * *